(12) United States Patent
Han et al.

(10) Patent No.: US 11,367,876 B2
(45) Date of Patent: Jun. 21, 2022

(54) COPPER FOIL FOR SECONDARY BATTERY, METHOD OF MANUFACTURING THE SAME, AND SECONDARY BATTERY INCLUDING THE SAME

(71) Applicant: LG Chem, Ltd., Seoul (KR)

(72) Inventors: Hyung-Seok Han, Daejeon (KR); Jae-Won Moon, Daejeon (KR); Hyung-Kyun Yu, Daejeon (KR); Ki-Hoon Paeng, Daejeon (KR)

(73) Assignee: LG Energy Solution, Ltd.

( * ) Notice: Subject to any disclaimer, the term of this patent is extended or adjusted under 35 U.S.C. 154(b) by 125 days.

(21) Appl. No.: 16/467,317

(22) PCT Filed: Jul. 6, 2018

(86) PCT No.: PCT/KR2018/007724
§ 371 (c)(1),
(2) Date: Jun. 6, 2019

(87) PCT Pub. No.: WO2019/022408
PCT Pub. Date: Jan. 31, 2019

(65) Prior Publication Data
US 2020/0067103 A1    Feb. 27, 2020

(30) Foreign Application Priority Data

Jul. 25, 2017   (KR) ........................ 10-2017-0094256
Jun. 29, 2018   (KR) ........................ 10-2018-0075894

(51) Int. Cl.
*H01M 4/66*   (2006.01)
*H01M 4/04*   (2006.01)
*H01M 4/62*   (2006.01)

(52) U.S. Cl.
CPC ........ *H01M 4/661* (2013.01); *H01M 4/0404* (2013.01); *H01M 4/622* (2013.01); *H01M 4/667* (2013.01)

(58) Field of Classification Search
CPC . H01M 4/02–0404; H01M 4/04–0404; H01M 4/661; H01M 4/667
(Continued)

(56) References Cited

U.S. PATENT DOCUMENTS

| 4,193,846 A | 3/1980 | Barrett |
| 2002/0117469 A1 | 8/2002 | Jito et al. |
| 2006/0019168 A1 | 1/2006 | Li et al. |

(Continued)

FOREIGN PATENT DOCUMENTS

| CN | 102473962 A | 5/2012 |
| CN | 101984514 B | 2/2013 |

(Continued)

OTHER PUBLICATIONS

EPO machine translation of CN 104693908 originally published to Liu Dezhi on Jun. 10, 2015 (Year: 2015).*

(Continued)

*Primary Examiner* — Cynthia H Kelly
*Assistant Examiner* — Niara Trant
(74) *Attorney, Agent, or Firm* — Lerner, David, Littenberg, Krumholz & Mentlik, LLP

(57) ABSTRACT

Provided are a copper foil for a secondary battery, which has excellent oxidation resistance without having to use chromium and has excellent adhesion to an active material layer after being processed to an electrode current collector, a method of manufacturing the copper foil, and a secondary battery including the copper foil. In the copper foil for a secondary battery, a styrene butadiene rubber (SBR) layer is formed on a surface of an electro-deposited copper foil.

13 Claims, 4 Drawing Sheets

(58) Field of Classification Search
USPC ........................................................ 429/220
See application file for complete search history.

(56) References Cited

U.S. PATENT DOCUMENTS

| | | | |
|---|---|---|---|
| 2010/0273052 | A1 | 10/2010 | Sakitani et al. |
| 2012/0040241 | A1* | 2/2012 | Kim .................. H01M 10/0525 429/209 |
| 2012/0107700 | A1 | 5/2012 | Deguchi |
| 2013/0255074 | A1 | 10/2013 | Uchida et al. |
| 2014/0054492 | A1 | 2/2014 | Mukai et al. |
| 2014/0183406 | A1* | 7/2014 | Ide .......................... C01B 33/02 252/182.1 |
| 2018/0323438 | A1 | 11/2018 | Kim |

FOREIGN PATENT DOCUMENTS

| | | |
|---|---|---|
| CN | 103805935 A | 5/2014 |
| CN | 104693908 A * | 6/2015 |
| JP | H11250916 A | 9/1999 |
| JP | 200243192 A | 2/2002 |
| JP | 2008501213 A | 1/2008 |
| JP | 4245270 B2 | 3/2009 |
| JP | 5622059 B2 | 11/2014 |
| KR | 20030039937 A | 5/2003 |
| KR | 20100056263 A | 5/2010 |
| KR | 20100112127 A | 10/2010 |
| KR | 101411731 B1 | 6/2014 |
| KR | 20150086222 A | 7/2015 |
| KR | 20170053888 A | 5/2017 |

OTHER PUBLICATIONS

International Search Report from PCT/KR2018/007724 dated Oct. 2, 2018, 3 pages.
Extended European Search Report including Written Opinion for Application No. EP18838027.3 dated Dec. 3, 2019.

* cited by examiner

COPPER FOIL FOR SECONDARY BATTERY, METHOD OF MANUFACTURING THE SAME, AND SECONDARY BATTERY INCLUDING THE SAME

CROSS-REFERENCE TO RELATED APPLICATIONS

This application is a national phase entry under 35 U.S.C. § 371 of International Application No. PCT/KR2018/007724, filed Jul. 6, 2018, which claims priority to Korean Patent Application No. 10-2017-0094256, filed Jul. 25, 2017 and Korean Patent Application No. 10-2018-0075894, filed Jun. 29, 2018, the disclosures of which are incorporated herein by reference.

TECHNICAL FIELD

The present disclosure relates to a copper foil for a secondary battery, a method of manufacturing the same, and a secondary battery including the same, and more particularly, to an electro-deposited copper foil having a satisfactory performance as a copper foil for a secondary battery without having to contain a chromium element (Cr) as a surface processing element, such as a rust prevention (rust protection) or the like.

BACKGROUND ART

With the recent rapid increase in demands for portable electronic products, such as laptop computers, video cameras, portable phones, etc., and regularization of development of electric cars, storage batteries for energy storage, robots, satellites, etc., studies on high performance secondary batteries capable of repetitive charging and discharging are actively conducted. Among currently commercialized secondary batteries, a lithium secondary battery is in the limelight because the lithium secondary battery has almost no memory effect compared to a nickel-based secondary battery and thus is free of being charged and discharged, has a very low self-discharge rate, and has high energy density.

In general, a secondary battery has a structure including a positive electrode and a negative electrode arranged with a separation film therebetween, wherein the positive electrode has a structure in which a positive electrode active material is attached to a positive electrode current collector and the negative electrode has a structure in which a negative electrode active material is attached to a negative electrode current collector.

In a lithium secondary battery, an electro-deposited copper foil is mainly used as a material of a negative electrode current collector. The electro-deposited copper foil is employed by almost all manufactures because of phase stability, wide responsiveness, purity, and easiness to deal with long winding among various materials used as the negative electrode current collector.

However, the electro-deposited copper foil is oxidized from the moment it is exposed to the air from an electrolyzer. Such oxidization produces CuO and $CuO_2$, which not only act as factors deteriorating electric characteristics but also causes outer shape problems. Thus, generally, as rust preventing element or surface modifying element of the electro-deposited copper foil, a chromium component has been widely used via chromium plating or chromate treatment. In particular, the chromate treatment is used for most of electro-deposited copper foils in the market recent years. When the chromium component exists as a chromium component, the oxidation number is trivalent or hexavalent. Toxicity to living organisms is much higher in a hexavalent chromium and also, mobility in soil is higher in the hexavalent chromium.

Accordingly, European Union's End-of-Life-Vehicle Direction (EU ELV) adopted a proposal of prohibiting the use of environmentally hazardous materials, such as lead, hexavalent chromium, mercury, and cadmium, in new vehicles registered in the EU market from Jul. 1, 2003, and promotes the active use of trivalent chromium. Also, from the promoted consciousness of recent environmental problems, even when trivalent chromium is used, trivalent chromium may be transformed to hexavalent chromium due to incorrect disposal, or trivalent chromium may be determined as hexavalent chromium due to wrong analysis method. In this regard, an electro-deposited copper foil that does not use a component of chromium needs to be developed.

A metal component other than copper treated on a surface of the electro-deposited copper foil is generally called a rust prevention treatment layer (rust-preventive layer) and is used to secure long conservative property by protecting the electro-deposited copper foil from atmospheric oxidation. However, a type of the rust prevention treatment layer largely affects adhesion to a negative electrode active material layer after the electro-deposited copper foil is processed to a negative electrode current collector.

Separately from development of the rust prevention treatment layer of the electro-deposited copper foil, studies of processes of manufacturing an electrode of a secondary battery are also being conducted. The electro-deposited copper foil has a very excellent hydrophilic property but has a limitation to adhesion to the negative electrode active material layer. In order to avoid such limitation, technologies for increasing adhesion by increasing the content of binder while preparing negative electrode active material slurry, coating a carbon layer on the electro-deposited copper foil as a primer, or multi-layering a negative electrode active material coating layer via method called double layer are currently being applied. Such a method must be accompanied by settlement of battery capacity/cost/equipment investment, etc., and due to an increase in process control factors, overall yields and productivity are adversely affected.

Accordingly, there is a great need for a copper foil for a secondary battery, which has rust prevention and oxidation resistance without having to use chromium in a rust prevention treatment layer of an electro-deposited copper foil and has excellent adhesion to a negative active material layer after being processed to a negative electrode current collector.

DISCLOSURE

Technical Problem

The present disclosure is designed to solve the problems of the related art, and therefore the present disclosure is directed to providing a copper foil for a secondary battery, which has excellent oxidation resistance without having to use chromium and has excellent adhesion to a negative electrode active material layer after being processed to a negative electrode current collector.

The present disclosure is also directed to providing a method of manufacturing the copper foil for a secondary battery.

The present disclosure is also directed to providing a secondary battery using the copper foil for a secondary battery.

However, objects of the present disclosure are not limited to the above, and other objects that are not described above will be clearly understood by one of ordinary skill in the art from description of the present disclosure below.

Technical Solution

In one aspect of the present disclosure, there is provided a copper foil for a secondary battery, wherein a styrene butadiene rubber (SBR) layer is formed on a surface of an electro-deposited copper foil.

The SBR layer may completely coat the surface of the electro-deposited copper foil and may be a continuous layer in a thickness direction, a width direction, and a length direction.

The SBR layer may be formed on two surfaces of the electro-deposited copper foil and may have a rust preventing function. Also, the electro-deposited copper foil may not contain a chromium element as a rust prevention surface treating element.

The SBR layer may be immediately coated on the surface of the electro-deposited copper foil prepared on a drum surface from an electrolyzer, without an artificial treatment.

The inventor of the present disclosure discovered that by actively using SBR as a rust prevention treatment layer on a surface of an electro-deposited copper foil, excellent oxidation resistance is obtained without having to employ chromium-containing rust prevention treatment layer, such as chromate treatment, and further, adhesion to a negative electrode active material layer is increased, and thus invented the present disclosure.

Such a copper foil for a secondary battery may be applied as a negative electrode current collector of the secondary battery.

The thickness of the electro-deposited copper foil may be in a range from 3 μm to 30 μm.

The thickness of the SBR layer may be in a range from 0.5 μm to 5 μm.

Also, in a method of manufacturing a copper foil for a secondary battery according to the present disclosure, the electro-deposited copper foil may be manufactured via electro-deposition on a drum in an electrolyzer and the electro-deposited foil may be wound around a bobbin through an SBR surface treatment section while the electro-deposited copper foil is taken out from the electrolyzer. In particular, the SBR surface treatment section may be provided with an SBR aqueous solution treatment tank and a hot air drying furnace in an in-line manner.

The SBR layer may be formed by coating an SBR aqueous solution, in which SBR is dispersed in water at a concentration of 1 g/l to 10 g/l, on a surface of the electro-deposited copper foil and drying the SBR aqueous solution.

Also, the drying may be performed in a temperature atmosphere of 160° C. to 200° C.

Here, the drying may be continued for 30 to 240 minutes in a temperature atmosphere of 180° C. to 190° C. to obtain a baking effect in addition to drying, beyond the concept of simple drying.

Meanwhile, in a secondary battery according to the present disclosure, a copper foil for a secondary battery according to the present disclosure is applied as a current collector of a negative electrode.

The secondary battery may include an electrode assembly including a positive electrode, a negative electrode, and a separation film.

In the negative electrode, a negative electrode active material layer including a negative electrode active material, a conductive material, and a binder is formed on the current collector, and the content of binder may be 1 to 15 wt % based on the total weight of the negative electrode active material layer. In particular, the binder may be SBR.

The negative electrode may include only the electro-deposited copper foil, the SBR layer, and the negative electrode active material layer.

Advantageous Effects

A copper foil for a secondary battery according to the present disclosure is in a state in which a styrene butadiene rubber (SBR) layer is formed as a rust prevention treatment layer. The copper foil for a secondary battery including such a rust prevention treatment layer has an advantage of not using a harmful substance because chromium is not used in a rust prevention treatment layer of an electro-deposited copper foil.

The copper foil for a secondary battery according to the present disclosure exhibits the same or higher performance even when compared with a general copper foil on which a chromate treatment is performed. Not only mechanical characteristics, such as tensile strength and elongation, but also surface roughness are similar to those of a general electro-deposited copper foil such that, when the copper foil for a secondary battery according to the present disclosure is used as a negative electrode current collector of the secondary battery, adhesion between the negative electrode current collector and a negative electrode active material layer is increased by 40 to 70% compared to the general electro-deposited copper foil without having to change processes of manufacturing the secondary battery.

In other words, the present specification simply states the rust prevention treatment layer, but the adhesion to the negative electrode active material layer is increased by the presence of the rust prevention treatment layer. Accordingly, a primer coating layer that is additionally formed to improve adhesion to a negative electrode active material layer when a general electro-deposited copper foil on which a chromate rust prevention treatment is performed is used is not required to be formed.

The SBR layer included in the copper foil for a secondary battery according to the present disclosure as such not only functions as the rust prevention treatment layer, but also functions as an adhesive layer providing excellent adhesion to the negative electrode active material layer. Accordingly, the SBR layer included in the copper foil for a secondary battery according to the present disclosure may be referred to as an SBR complex functional layer.

When such a copper foil for a secondary battery is used as the negative electrode current collector, the content of binder in negative electrode active material slurry may be reduced. In general, while a negative electrode active material dried after being coated, the binder may move to a surface of the negative electrode active material layer thereby weakening the adhesion between the negative electrode current collector and the negative electrode active material layer. In this regard, the content of binder in the negative electrode active material slurry is increased. The SBR layer included in the copper foil for a secondary battery according to the present disclosure reduces the movement of binder in the negative electrode active material layer, and as a result, reduces the content of binder in the negative electrode active material slurry and increases the amount of negative electrode active material, thereby increasing the capacity of the secondary battery.

As such, according to the present disclosure, the copper foil for a secondary battery having not only excellent oxidation resistance, but also properties, such as excellent adhesion to the negative electrode active material layer after being processed to the negative electrode current collector, and increasing the capacity of the secondary battery when used as the negative electrode current collector may be provided.

Also, the copper foil for a secondary battery according to the present disclosure may form the SBR layer as the rust prevention treatment layer by immersing an electro-deposited copper foil in an SBR aqueous solution. Accordingly, process management set in existing processes of manufacturing the electro-deposited copper foil does not become complex and management expenses do not increase.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Figure 1:
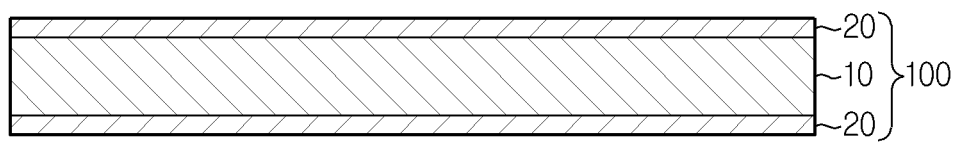
FIG. 1 is a cross-sectional view of a copper foil for a secondary battery, according to an embodiment of the present disclosure.

Objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In embodiments described hereinafter, a secondary battery denotes a lithium secondary battery. Here, the lithium secondary battery is a general term for a secondary battery in which lithium ions act as working ions during charging and discharging to cause an electrochemical reaction between a positive electrode and a negative electrode.

Meanwhile, even when a name of the secondary battery is changed depending on a type of an electrolyte or separation film used in the lithium secondary battery, a type of a battery case that forms an outer shape of the secondary battery, and an internal or external structure of the lithium secondary battery, the secondary battery should be interpreted as being included in the category of the lithium secondary battery as long as the lithium ions act as working ions.

A copper foil for a secondary battery of the present disclosure may be applied to another secondary battery other than the lithium secondary battery. Accordingly, even when working ions are not lithium ions, any secondary battery to which the technical idea of the present disclosure is applicable should be construed as being included in the scope of the present disclosure regardless of a type.

Also, the secondary battery is not limited by the number of elements constituting the secondary battery. Accordingly, the secondary battery may be construed as including, in addition to a single cell including an electrolyte and an electrode assembly of a positive electrode/separation film/negative electrode in one battery case, an assembly of the single cell, a module in which a plurality of assemblies are connected in series and/or in parallel, a pack in which a plurality of modules are connected in series and/or in parallel, and a battery system in which a plurality of packs are connected in series and/or in parallel.

First, a copper foil for a secondary battery, according to an embodiment of the present disclosure is described with reference to FIG. 1.

FIG. 1 is a cross-sectional view of a copper foil 100 for a secondary battery, according to an embodiment of the present disclosure.

The copper foil 100 for a secondary battery according to an embodiment of the present disclosure shown in FIG. 1 may be used as a negative electrode current collector of the secondary battery. In other words, in the secondary battery, the copper foil 100 may be used as a negative electrode current collector combined to a negative electrode active material.

In the copper foil 100 for a secondary battery according to an embodiment of the present disclosure, a styrene butadiene rubber (SBR) layer 20 is formed on a surface of an electro-deposited copper foil 10. The SBR layer 20 is formed on two sides of the electro-deposited copper foil 10, and has a rust preventing function.

The SBR layer 20 is in the form of a film, and may be formed evenly on the surface of the electro-deposited copper foil 10 at a uniform thickness in a form of a continuous layer without exposing even a portion of the electro-deposited copper foil 10. Thus, the SBR layer 20 completely coats the surface of the electro-deposited copper foil 10 and is a continuous layer in a thickness direction, width direction, and length direction. Also, there is no layer deliberately formed between the electro-deposited copper foil 10 and the SBR layer 20. In other words, the SBR layer 20 is immediately formed on the surface of the electro-deposited copper foil 10 without forming a chromate treated layer. For example, the SBR layer 20 is immediately coated on the surface of the electro-deposited copper foil 10 prepared on a drum surface from an electrolyzer without an artificial treatment.

The thickness of the electro-deposited copper foil 10 may be from about 3 μm to about 30 μm.

When the thickness of the electro-deposited copper foil 10 is less than about 3 μm and thus is too thin, workability may deteriorate due to difficult handling during processes of manufacturing a secondary battery, and on the other hand, when the thickness of the electro-deposited copper foil 10 is greater than about 30 μm, it is difficult to manufacture a high capacity secondary battery due to a volume increase caused by the thickness of a negative electrode current collector when the electro-deposited copper foil 10 is used as the negative electrode current collector.

The SBR layer 20 is formed on the surface of the electro-deposited copper foil 10 for rust preventing treatment of the electro-deposited copper foil 10. Also, the SBR layer 20 may assign not only a rust preventing characteristic with respect to the electro-deposited copper foil 10, but also a characteristic of an increased adhesion to the negative electrode active material.

The thickness of the SBR layer 20 may be in a range of 0.5 μm to 5 μm. When the thickness of the SBR layer 20 is less than 0.5 μm, desired degrees of oxidation resistance and adhesion may not be obtained. When the thickness of the SBR layer 20 is greater than 5 μm, the amount occupied by the SBR layer 20 is relatively large, and thus battery capacity may not be satisfactory and resistance may be caused.

The tensile strength and elongation of the copper foil 100 are determined mainly based on the tensile strength and elongation of the electro-deposited copper foil 10, and the tensile strength and elongation of the electro-deposited copper foil 10 do not deteriorate by the formation of the SBR layer 20. For example, the tensile strength of the copper foil 100 may be from 30 kgf/mm$^2$ to 35 kgf/mm$^2$, but the SBR layer 20 may be additionally formed based on any electro-deposited copper foil regardless of the tensile strength of the electro-deposited copper foil 10. Also, since elongation of an electro-deposited copper foil is generally about 5% to 20%, the copper foil 100 manufactured from such an electro-deposited copper foil may exhibit a similar level of elongation. For example, the elongation may be 16% to 18%. Such levels of tensile strength and elongation may prevent breakage and deformation at the time of manufacturing a copper foil for a secondary battery, and also enable a suitable level of handling when a negative electrode is manufactured by coating negative electrode active material slurry afterwards.

According to existing chromate treatment, a roughness characteristic of an electro-deposited copper foil that has already been prepared may be changed. However, in the present disclosure, since the SBR layer 20 is formed without chromate treatment, a roughness characteristic of the electro-deposited copper foil 10 is almost maintained.

Surface roughness of two surfaces of the copper foil 100 may be about 0.2 μm to 2.5 μm based on Rz (ten-point average roughness). When the surface roughness is less than about 0.2 μm, the adhesion between the copper foil 100 and the negative electrode active material deteriorates, and when the adhesion between the copper foil 100 and the negative electrode active material deteriorates as such, an active material detachment phenomenon is highly likely to occur while the second battery is used.

On the other hand, when the surface roughness is greater than about 2.5 μm, the adhesion may deteriorate because the negative electrode active material may not be evenly coated on the surface of the copper foil 100 due to high roughness, and when the negative electrode active material is not evenly coated, a discharge capacity retention rate of the manufactured secondary battery may deteriorate.

For example, the surface roughness of the two surfaces of the copper foil 100 is 0.835 μm to 1.115 μm. Generally, the surface roughness of a surface contacting a drum (a drum contacting surface) and the surface roughness of a surface exposed to the air at the opposite side (an air exposed surface) of the electro-deposited copper foil 10 are different due to a manufacturing method. Normally, the surface roughness of the drum contacting surface is larger than the surface roughness of the air exposed surface. In the copper foil 100 according to an embodiment of the present disclosure, the surface roughness of the drum contacting surface may be, for example, 0.84 μm and the surface roughness of the air exposed surface may be, for example, 1.09 μm.

The copper foil 100 including such an SBR layer 20 does not use a harmful substance because chromium is not used for the rust prevention treatment layer of the electro-deposited copper foil 10. The copper foil 100 according to an embodiment of the present disclosure exhibits the same or higher performance even when compared with a general electro-deposited copper foil on which chromate treatment is performed. Not only mechanical characteristics, such as a tensile strength and elongation, but also surface roughness are similar to those of the general electro-deposited copper foil such that pre-set processes of manufacturing a secondary battery are not changed when a copper foil according to the present disclosure is used as a negative electrode current collector.

The adhesion between the copper foil 100 and the negative electrode active material layer may vary according to the content of binder in the negative electrode active material layer, but the content of binder may be determined and the copper foil 100 of the present disclosure may be manufactured such that, for example, the adhesion to the negative electrode active material layer is 20 gf to 30 gf. When the negative electrode active material layer using the determined content of binder is applied to the general electro-deposited copper foil, the adhesion is decreased to 40 to 70% of the adhesion of the present disclosure. Thus, in order for the general electro-deposited copper foil to exhibit the same level of adhesion of the present disclosure, the content of binder needs to be increased. As such, according to the present disclosure, the adhesion of a level increased by 40 to 70% than the general electro-deposited copper foil may be obtained without having to increase the content of binder.

In other words, the present specification simply states the rust prevention treatment layer, but the adhesion to the negative electrode active material layer is increased by the presence of the rust prevention treatment layer. Accordingly, a primer coating layer that is additionally formed to improve adhesion to a negative electrode active material layer when a general electro-deposited copper foil on which a chromate rust prevention treatment is performed is used is not required to be formed.

As such, the SBR layer 20 included in the copper foil 100 not only functions as the rust prevention treatment layer, but also functions as an adhesive layer providing excellent adhesion to the negative electrode active material layer. Accordingly, the SBR layer 20 included in the copper foil 100 may also be referred to as an SBR complex functional layer.

Figure 2:
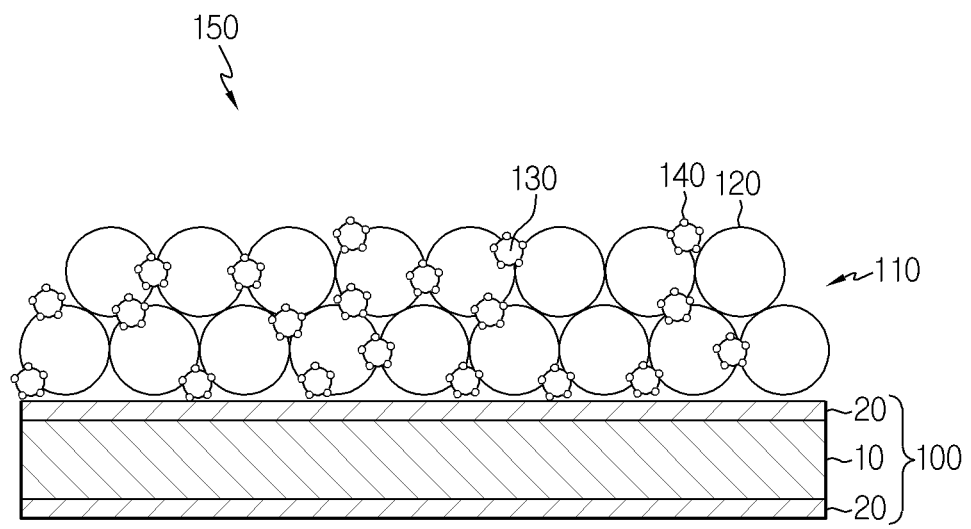
FIG. 2 is a cross-sectional view of a negative electrode manufactured by using the copper foil of FIG. 1.

FIG. 2 is a cross-sectional view of a negative electrode 150 manufactured by using the copper foil 100 of FIG. 1.

Referring to FIG. 2, in the negative electrode 150, a negative electrode active material layer 110 is formed on the copper foil 100. The negative electrode active material layer 110 includes a negative electrode active material 120, such as graphite, a conductive material 130, and a binder 140.

The negative electrode active material 120 may include, for example, at least one carbon-based material selected from the group consisting of crystalline artificial graphite, crystalline natural graphite, amorphous hard carbon, low crystalline soft carbon, carbon black, acetylene black, graphene, and fibrous carbon, a Si-based material, and a metal complex oxide such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, Group 1, 2, and 3 elements in the periodic table, halogen; $0 \le x \le 1$; $1 \le y \le 3$; $1 \le z \le 8$) or the like; a lithium metal; a lithium alloy; a silicon-based alloy; a tin-based alloy; a metal oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; a conductive polymer such as polyacetylene; a Li—Co—Ni-based material; a titanium oxide; and a lithium titanium oxide, or the like, but the present disclosure is not limited thereto.

The conductive material 130 is not specifically limited as long as it has conductivity while not causing a chemical change to the secondary battery, and a conductive material, for example, graphite such as a natural graphite or artificial graphite; carbon black such as acetylene black, Ketjen black, channel black, furnace black, lamp black, and summer black; conductive fiber such as carbon fiber or metal fiber; metal powder such as carbon fluoride, aluminum, or nickel powder; conductive whisker such as zinc oxide or potassium titanate; a conductive metal oxide such as titanium oxide; and polyphenylene oxide may be used. Examples of a commercialized conductive material include products of Chevron Chemical Company, Denka Singapore Private Limited, and Gulf Oil Company, which are acetylene black series, products of Armak Company, which are EC series, Vulcan XC-72 (a product of Cabot Company), and Super P (a product of Timcal Ltd.).

The binder 140 may include various copolymers of one or more monomers selected from the group consisting of polyvinylidene fluoride, polyvinyl alcohol, carboxymethyl-cellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, SBR, fluororubber, styrene monomer (SM), butadiene (BD), and butyl acrylate (BA).

The negative electrode active material layer 110 is manufactured by coating and drying negative electrode active material slurry on the copper foil 100, the negative electrode active material slurry including the negative electrode active material 120, the conductive material 130, and the binder 140. Here, a filler may be selectively added to the negative electrode active material slurry as a component for suppressing expansion of an electrode. The filler is not specifically limited as long as it is a fibrous material while not causing a chemical change to the secondary battery, and for example, an olefin-based polymer such as polyethylene or polypropylene; and a fibrous material such as glass fiber or carbon fiber may be used. Also, other components, such as a viscosity adjusting agent, an adhesion accelerator, etc., may be added selectively or in combination of two or more. The viscosity adjusting agent is a component that adjusts viscosity of the negative electrode active material slurry such that a mixing process and coating process of the negative electrode active material slurry are facilitated, and may be added up to 30 wt % based on the total weight of the negative electrode active material slurry. Examples of the viscosity adjusting agent include CMC, polyvinylidene fluoride, etc., but are not limited thereto.

Generally, an easiest method for realizing high capacity in a secondary battery is to provide a large amount of electrode active material on a current collector, but such a method may cause electrode detachment during electrode coating, drying, and rolling processes if a certain level of electrode adhesion is not obtained, thereby deteriorating performance and stability of a secondary battery.

Accordingly, in order to manufacture a secondary battery having excellent performance and stability while having high capacity, studies on a method of improving electrode adhesion are actively conducted in the related fields, and a method of adding the binder 140 in an electrode to improve the electrode adhesion is currently widely used.

Generally, an electrode active material, a conductive material, and a current collector included in an electrode are solid at room temperature and have different surface characteristics, and thus are difficult to be bonded at room temperature. However, when a polymer binder is used, adhesion between the components of the electrode is increased, and thus a detachment phenomenon of the electrode during electrode coating, drying, and rolling processes may be suppressed. However, in processes of drying the electrode at a high temperature equal to or higher than 100° C. after coating, a binder included in a slurry state may move in a direction a solvent is volatilized (a direction away from the current collector) due to a temperature condition equal to or higher than Tg of the binder, thereby weakening adhesion between an electrode current collector and an electrode active material.

Thus, generally, a portion where adhesion between an electrode current collector and an electrode active material layer is weakened is generated as a binder is moved to a surface of the electrode active material layer while an electrode active material is dried after being coated, and in order to prevent the weakened adhesion, the content of binder in electrode active material slurry is increased. The adhesion between the copper foil according to an embodiment of the present disclosure and the negative electrode active material layer 110 may be 20 gf to 30 gf, which is increased by 40 to 70% of that of a general electro-deposited copper foil. As such, the SBR layer 20 of the copper foil 100 reduces the movement of the binder 140 in the negative electrode active material layer 110, and as a result, reduces the content of binder 140 in negative electrode active material slurry and increases the amount of negative electrode active material 120, thereby increasing the capacity of a secondary battery including the negative electrode 150.

As such, since the SBR layer 20 increases the bonding between the negative electrode active material 120 and the electro-deposited copper foil 10, a remarkably high level of adhesion may be obtained compared to the related art even when the content ratio of binder 140 is decreased, and it is possible to use the content of binder much less than the content of binder required to obtain such adhesion. Thus, an effect of cost reduction is obtained and at the same time, an effect equal to or higher than a certain level is obtained in terms of capacity and conductivity of an electrode.

In particular, when SBR is used as the binder 140, certain continuity is assigned to a bonding interface between the SBR layer 20 and the negative electrode active material layer 110 due to the sameness of material with the SBR layer 20, and thus structural robustness may be promoted even when frequent charging and discharging cycles are applied while using the secondary battery.

As such, since the copper foil 100 includes the SBR layer 20, the adhesion to the negative electrode active material layer 110 is satisfactory. Accordingly, when the copper foil 100 is used as a negative electrode current collector, the content of binder 140 in the negative electrode active material slurry may be reduced. When the content of binder 140 is too large, resistance increase in an electrode is caused and the amounts of electrode active material and conductive material are relatively decreased, and thus the capacity and conductivity of the electrode may be decreased. In the present disclosure, since sufficient adhesion is obtained even when the content of binder 140 is smaller than that of the related art, the content of binder 140 may be 1 to 15 wt % based on the total weight of the negative electrode active material layer 110. When the content of binder 140 is less than 1 wt %, an effect of adding the binder 140 is insignificant. When the content of binder 140 is greater than 15 wt %, the capacity and conductivity of the negative electrode 150 may not be satisfactory.

The amount of conductive material 130 may be 20 parts by weight to 100 parts by weight based on 100 parts by weight of the binder 140. When the content of binder 140 is less than 20 parts by weight, a desired degree of conductivity is not obtained, and when the content of binder 140 is greater than 100 parts by weight, the amount of negative electrode active material 120 is relatively reduced and thus capacity is reduced.

As such, since the negative electrode 150 includes the SBR layer 20, the negative electrode 150 may have excellent adhesion to the negative electrode active material layer 110. Accordingly, there is no need to solve the adhesion by coating a carbon layer on an electro-deposited copper foil as a primer as in the related art or by multi-layering an active material coating layer via a method called a double layer, and since the negative electrode 150 includes only the electro-deposited copper foil 10, the SBR layer 20, and the negative electrode active material layer 110, the negative electrode 150 may have a very simple and concise structure and manufacturing process.

Meanwhile, in the current embodiment, the negative electrode active material layer 110 is provided on one surface of the copper foil 100, but the negative electrode active material layer 110 may be formed on two surfaces of the copper foil 100.

A secondary battery according to the present disclosure may be manufactured in the same or similar manner as an existing secondary battery by including such a negative electrode 150 as a battery element. Generally, since a secondary battery includes a positive electrode, a negative electrode, a separation film, and an electrolyte, and is accommodated in a battery case, the secondary battery according to the present disclosure may be manufactured by sealing an electrode assembly and an electrolyte in a battery case, wherein the electrode assembly has a structure including the negative electrode 150 and a corresponding positive electrode, and a separation film therebetween. For example, a pouch type secondary battery as shown in FIG. 4 may be manufactured.

Figure 3:
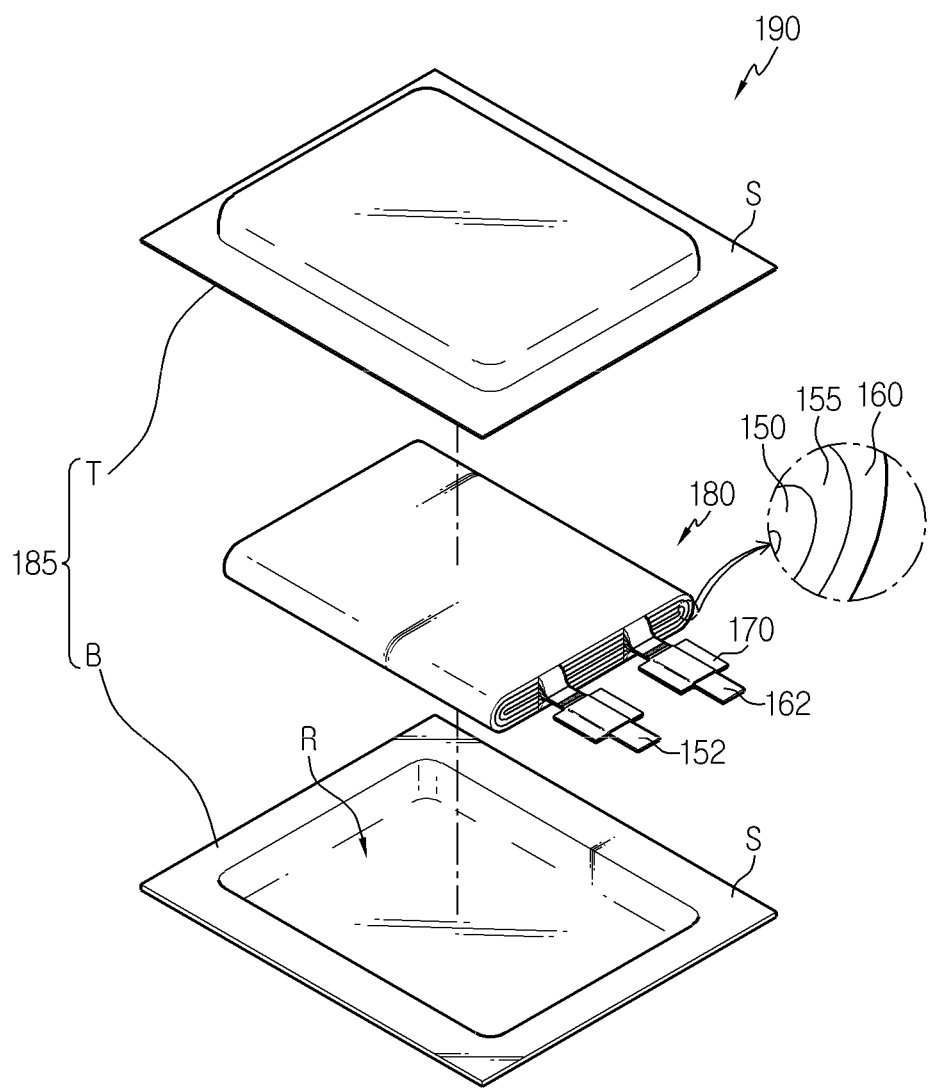
FIG. 3 is an exploded perspective view schematically showing a configuration of a secondary battery, according to an embodiment of the present disclosure.
Figure 4:
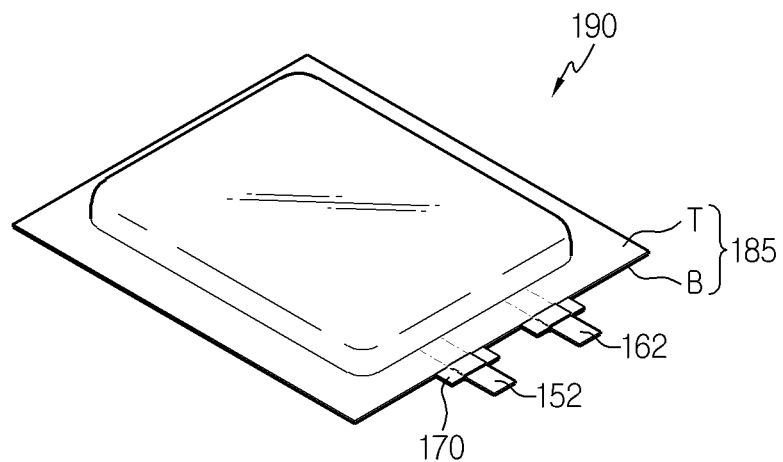
FIG. 4 is a perspective view of a secondary battery according to an embodiment of the present disclosure.

FIG. 3 is an exploded perspective view schematically showing a configuration of a secondary battery 190, according to an embodiment of the present disclosure, and FIG. 4 is a perspective view of the secondary battery 190 according to an embodiment of the present disclosure.

Referring to FIGS. 3 and 4, the secondary battery 190 according to an embodiment of the present disclosure is a pouch type battery, and includes an electrode assembly 180 and a pouch 185.

The electrode assembly 180 has a structure in which the negative electrode 150 and a positive electrode 160 face each other, and a separation film 155 is provided between the negative electrode 150 and the positive electrode 160. Such an electrode assembly 180 may be a stack type, a stack-and-folding type, or a jelly-roll type.

As described above, the negative electrode 150 has a structure in which negative electrode active material slurry is coated on the copper foil 100 used as a negative electrode current collector. Similarly, the positive electrode 160 has a structure in which positive electrode active material slurry is coated on a positive electrode current collector, such as aluminum. Here, each current collector may include a non-coated portion on which slurry is not coated and an electrode tab corresponding to each electrode may be formed in such a non-coated portion such that a negative electrode lead 152 connected to a negative electrode tab and a positive electrode lead 162 connected to a positive electrode tab are taken out of the pouch 185.

The pouch 185 is a battery case, and as indicated by a reference character R in FIG. 3, includes an accommodating portion that is a concave space. At least a part of the electrode assembly 180 and an electrolyte, for example, an electrolyte solution, may be accommodated in the accommodating portion R. Also, for easy insertion of the electrode assembly 180, the pouch 185 may include an upper sheet T and a lower sheet B. Here, in the pouch 185, the accommodating portion R may be formed on both the upper sheet T and the lower sheet B, or may be formed on any one of the upper sheet T and the lower sheet B. Also, the upper sheet T and the lower sheet B may not be separated from each other, but may be connected to each other to form one unit of sheet.

Also, such an upper sheet T and lower sheet B may include sealing portions S on edges of internal storage spaces, and the sealing portions S are adhered to each other such that the internal storage spaces are sealed. A sealing tape 170 may be further provided between the upper sheet T and the lower sheet B to further improve adhesion to the negative electrode lead 152 and the positive electrode lead 162.

As such, the pouch 185 seals the electrode assembly 180 and the electrolyte solution accommodated therein, and protects the electrode assembly 180 and the electrolyte solution from the outside.

The descriptions above do not limit the structure or type of a secondary battery according to the present disclosure as long as the secondary battery according to the present disclosure uses a copper foil for a secondary battery according to the present disclosure as a negative electrode current collector. The applicant's prior patent documents may be referred to for general matters related the secondary battery other than those described herein, and thus details thereof will be omitted.

Next, a method of manufacturing a copper foil for a secondary battery, according to an embodiment of the present disclosure is described.

First, the method of manufacturing a copper foil for a secondary battery, according to the present disclosure may be performed by forming a process line via relatively simple changes, such as removing a chromate treatment section of a process line of manufacturing an existing electro-deposited copper foil and adding an SBR aqueous solution treatment tank.

For example, an electro-deposited copper foil is manufactured via electro-deposition on a drum in an electrolyzer and the electro-deposited foil is wound around a bobbin through an SBR surface treatment section while the electro-deposited copper foil is taken out from the electrolyzer. This is described in detail below.

Figure 5:
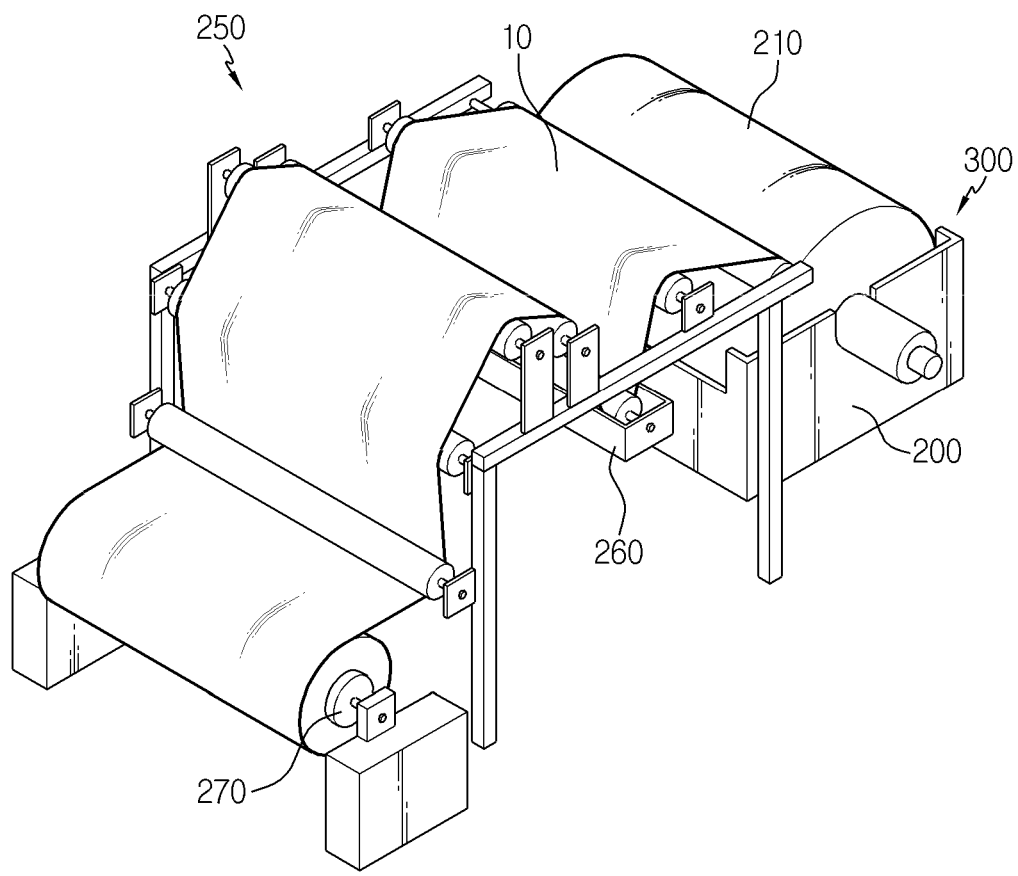
FIG. 5 is a schematic view of an apparatus for performing a method of manufacturing a copper foil for a secondary battery, according to an embodiment of the present disclosure.
Figure 6:
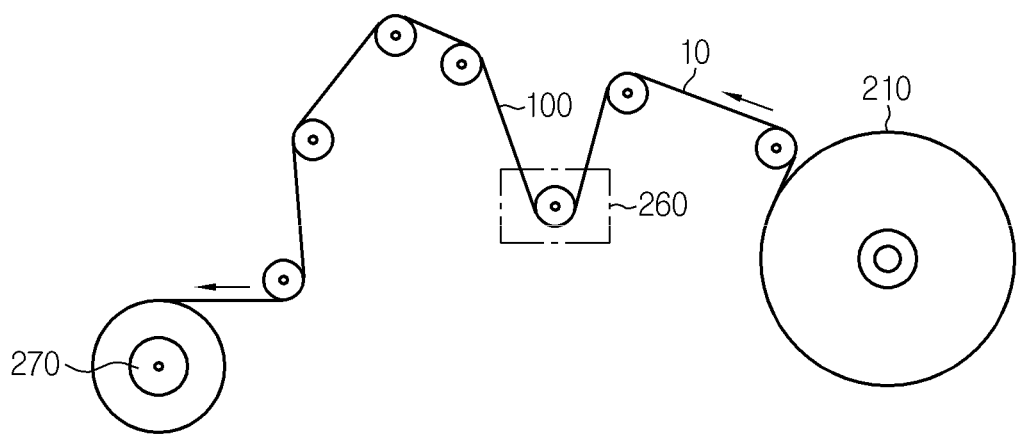
FIG. 6 is a schematic side view of the apparatus of FIG. 5.
Figure 7:
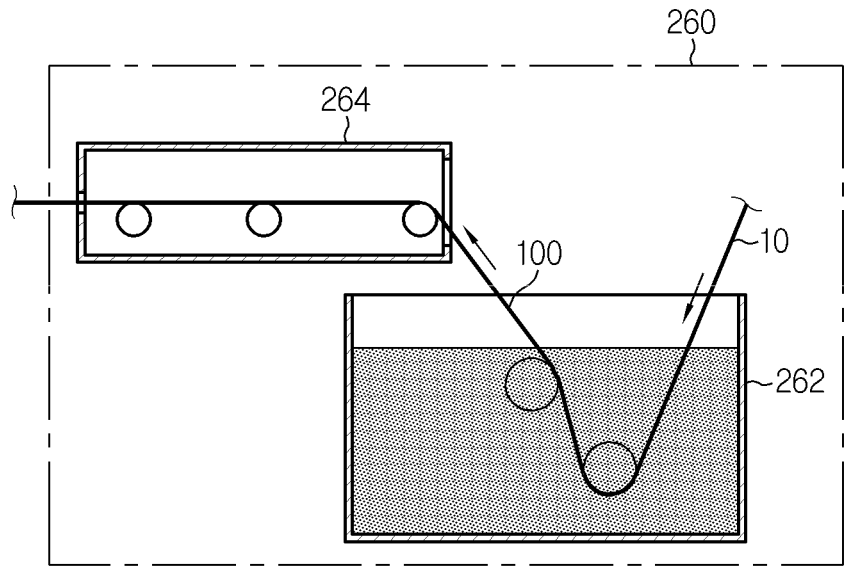
FIG. 7 illustrates a styrene butadiene rubber (SBR) aqueous solution treatment section that may be included in the apparatus of FIG. 5.

FIG. 5 is a schematic view of an apparatus for performing a method of manufacturing a copper foil for a secondary battery, according to an embodiment of the present disclosure, FIG. 6 is a schematic side view of the apparatus of FIG. 5, and FIG. 7 illustrates a SBR aqueous solution treatment section that may be included in the apparatus of FIG. 5.

For example, as shown in FIG. 5, the electro-deposited copper foil 10 may be manufactured first by using an electro-deposited copper foil manufacturing apparatus 300 including an iridium (Ir) coated titanium (Ti) rotating cathode drum 210 and electrodes spaced apart from each other around the drum 210 at intervals of about 3 to 20 mm, in an electrolyzer 200.

When the electro-deposited copper foil 10 related to the present disclosure is manufactured, copper sulfate electrolyte solution may be put into the electrolyzer 200, and electro-deposition may be performed on the drum 210 by adjusting a current density ratio. The copper sulfate electrolyte solution may typically have a copper concentration of 50 to 350 g/l and a sulfate concentration of 50 to 200 g/l. In order to obtain the electro-deposited copper foil 10 having a desired physical property and to control a mechanical property or surface state of the electro-deposited copper foil 10, the copper sulfate electrolyte solution may further include, as an organic additive, glue, gelatin, hydroxyethyl cellulose (HEC), sulfide-based compound, polyethylene glycol, a nitride, or the like. A temperature of the copper sulfate electrolyte solution may be 40 to 70° C. Current density is adjusted according to various conditions, such as a copper concentration, a sulfate concentration, a liquid supply rate, an inter-electrode distance, and the temperature of the copper sulfate electrolyte solution. Current density at a boundary between normal plating (a state in which copper is deposited in layers) and roughened plating (burned plating, a state in which copper is deposited in a crystalline shape (a ball shape, a needle shape, or a hoarfrost shape), uneven) is defined as limiting current density, and the current density is maintained within a limitation of the normal plating. The current density may be 10 to 80 A/dm$^2$.

The electro-deposited copper foil 10 is manufactured while having satisfactory releasability with the drum 210 and basically having satisfactory phase stability as a negative electrode current collector of a secondary battery. The electro-deposited copper foil 10 prepared in the electrolyzer 200 of FIG. 5 may be wound around a bobbin 270 through a transfer unit 250.

However, the electro-deposited copper foil 10 manufactured via such electroplating is oxidized from the moment it is exposed to the air from the electrolyzer 200. Such oxidization produces CuO and CuO$_2$, which not only act as factors deteriorating electric characteristics but also causes outer shape problems. Thus, generally, a section for chromate treatment is required in the middle of the transfer unit 250. In the present disclosure, an SBR surface treatment section 260 is added instead of a chromate treatment section. When the electro-deposited copper foil 10 prepared on the surface of the drum 210 in the electrolyzer 200 passes through the SBR surface treatment section 260 as shown in FIG. 6, the SBR layer 20 is formed on a surface or a rear surface, or further, on both surfaces, of the electro-deposited copper foil 10, and thus the electro-deposited copper foil 10 may become the copper foil 100 for a secondary battery and wound around the bobbin 270. Then, the copper foil 100 is cut to a required length, and then used to manufacture a negative electrode as a negative electrode active material layer is formed thereon.

A method of forming the SBR layer 20 on the surface of the electro-deposited copper foil 10 in the SBR surface treatment section 260 of FIG. 6 may be a method of coating and drying an SBR aqueous solution on the electro-deposited copper foil 10.

SBR may be easily dispersed even in water, in a form of emulsion. Accordingly, the SBR aqueous solution may be a type in which SBR is dispersed in an emulsion form or a type in which some or all of SBR is dissolved. Here, the amount of SBR is determined to be a level of determining viscosity of the SBR aqueous solution considering mixability in water, easiness of coating, and maintenance of a form after coating. An additive for adjusting the viscosity, such as CMC, may be further added. The SBR aqueous solution is a raw material, and a coating amount is determined by diluting SBR in water that is a solvent. The electro-deposited copper foil 10 may be continuously processed such that it is taken out from the electrolyzer 200, passes the SBR surface treatment section 260, and is wound around the bobbin 270. Alternatively, the electro-deposited copper foil 10 may be wound around the bobbin 270 after staying in the SBR surface treatment section 260 for a certain period of time.

Water may be purchased at low cost and very easily. Also, water is environmental friendly and generally easily maintenanced and processed. Accordingly, there is no difficulty in maintaining the SBR surface treatment section 260 compared to existing chromate treatment.

The SBR aqueous solution may be in a stirred state. The SBR aqueous solution, when left alone without being stirred, may start to be cured and/or separated.

A coating method includes any one of spraying by a spray, coating by a coater, immersing, and shedding of the SBR aqueous solution. In the current embodiment, an SBR aqueous solution treatment tank 262 is shown in FIG. 7 for an example of the immersing.

For example, an SBR aqueous solution in which SBR is dispersed in water at a concentration of 1 g/l to 10 g/l is contained in the SBR aqueous solution treatment tank 262, and the electro-deposited copper foil 10 is immersed in the SBR aqueous solution treatment tank 262 and then taken out. Next, the electro-deposited copper foil 10 treated with the SBR aqueous solution is dried such that the SBR layer 20 is formed on the surface of the electro-deposited copper foil 10. Here, a hot air drying furnace 264 may be provided at a stage after the SBR aqueous solution treatment tank 262 in an in-line manner. In the drying furnace 264, the SBR aqueous solution coated on the surface of the electro-deposited copper foil 10 may be dried by directly contacting hot air. A box type or tunnel type drying furnace may be used, and infrared heating, high frequency heating, or heating via a hot wire may be used as a heat source. For example, the drying furnace 264 may be a linear hot air drying durance such as a halogen line heater. When such an in-line configuration is adopted, an electro-deposited copper foil wound around the bobbin 270 is not required to be separately removed for SBR treatment and then rewound, and thus the copper foil 100 for a secondary battery may be obtained at low costs with high productivity suitable for continuous production.

The drying may be performed in a temperature atmosphere of 160° C. to 200° C. Also, beyond the concept of simple drying, the drying may be continued for 30 to 240 minutes in a temperature atmosphere of 180° C. to 190° C. to obtain a baking effect in addition to the drying. Here, as a process of increasing the adhesion of the SBR layer 20 on the surface of the electro-deposited copper foil 10, the baking includes, in addition to evaporation of water in the coated SBR aqueous solution, relocation of materials and densification of a film for close bonding between remaining SBR and close bonding between SBR and the electro-deposited copper foil 10. Through such drying, the SBR layer 20 is formed evenly on the surface of the electro-deposited copper foil 10 at a uniform thickness in a form of a continuous layer without exposing even a portion of the electro-deposited copper foil 10, and a detect, such as a minute crack or pin hole is not generated.

EXPERIMENT EXAMPLE

A commercially available general electro-deposited copper foil (Comparative Example) having a thickness of 18 μm and a copper foil (Example) sample for a secondary battery according to the present disclosure were prepared to measure mechanical characteristics, surface roughness, and adhesion.

The Example sample was prepared by coating an SBR aqueous solution in which SBR is dispersed in water at a concentration of 5 g/l on a surface of an electro-deposited copper foil having a thickness of 18 μm and then drying the electro-deposited copper foil. A thickness of an SBR layer after the drying was about 2 μm.

A specimen of 12.7 mm (W)×152.4 mm (L) was cut from each copper foil by using a tensile punching machine, and then tensile strength was measured in a room temperature atmosphere for 5 minutes after thermal treatment at 130° C. for 10 minutes. The tensile strength was measured by using Universal Test Machine (UTM) equipment of INSTRON widely used to measure mechanical properties. The specimen was mounted on the UTM equipment and then pulled under a condition of tension annealing (TA): speed 50 mm/min to measure the force at break and then calculate the tensile strength.

During such a tensile test, a length elongated up to immediately before breaking was measured to calculate elongation. When an initial length of the specimen is $L_0$ and the length immediately before breaking is L, $\Delta L(=L-L_0)$ is the elongated length of the specimen. The amount of the elongated length in percent, i.e., $(\Delta L/L_0)\times 100$, is the elongation.

The surface roughness and the adhesion were measured for each of a drum contacting surface and an air exposed surface of the electro-deposited copper foil.

The surface roughness was measured via a ten-point average calculation method by using a surface roughness meter (Rz roughness). As widely known, the ten-point average calculation method uses a cross-section curve as a reference length, and calculates a difference of averages by measuring intervals between highest to fifth highest peaks and deepest to fifth deepest valleys in a straight line that is parallel to an average line of the cross-section curve and not traversing the cross-section curve.

In order to evaluate the adhesion, negative electrode active material slurry was manufactured to be coated on each copper foil, and then the copper foil was dried at room temperature/high temperature and evaluated before and after rolling. A TA meter was used and a specimen having a length of 2.0 mm (W)×152.4 mm (L) was prepared. While a negative electrode active material layer is fixed to slide glass using a double-sided adhesive tape, the specimen was pulled and peeled off from an adhered end, and a broken state was viewed to determine an adhesive state (a peel test). The evaluation was performed while varying a pulling angle by 90° and 180°.

Table 1 shows results of measuring tensile strength, elongation, Rz roughness, and adhesion.

TABLE 1

Evaluation Result Summary

| Sample Type | | | Comparative Example | Example | Evaluation Result |
|---|---|---|---|---|---|
| Evaluation Items | Mechanical Characters | Tensile Strength (kgf/mm²) | 32.71 | 32.71 | No significant difference |
| | | Elongation (%) | 16.73 | 17.12 | |
| | Rz Roughness (μm) | Air Exposed Surface | 0.83 | 0.84 | No significant difference |
| | | Drum Contacting Surface | 1.14 | 1.09 | |
| | Adhesion (gf) | Air Exposed Surface Before Rolling | 14.52 | 20.71 | Increased by 42.6% |
| | | After Rolling | 22.74 | 28.48 | Increased by 25.3% |
| | | Drum Contacting Surface Before Rolling | 12.39 | 20.77 | Increased by 67.6% |
| | | After Rolling | 19.00 | 29.42 | Increased by 54.8% |

As shown in Table 1, the mechanical characters and surface roughness were measured to be in similar levels in the related art (Comparative Example) and the present disclosure (Example). In other words, the present disclosure satisfies specification conditions of an electro-deposited copper foil as a negative electrode current collector.

It is to be noted that the adhesion is remarkably increased in the present disclosure compared to the related art. The adhesion of the air exposed surface was increased by 42.6% before rolling and by 25.3% after rolling. The adhesion of the drum contacting surface was increased by 67.6% before rolling and by 54.8% after rolling. Thus, according to the present disclosure, the adhesion to a negative electrode active material layer is greatly improved, and thus the content of binder in negative electrode active material slurry may be reduced.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A copper foil for a secondary battery, consisting of: styrene butadiene rubber (SBR) layers,
wherein the SBR layers are present on two surfaces of the copper foil, wherein the copper foil is an electro-deposited copper foil,
wherein the SBR layers are disposed directly on the surfaces of the electro-deposited copper foil without any coating layer between each of the SBR layers and the electro-deposited copper foil,
wherein the SBR layer is immediately coated on the surfaces of the electro-deposited copper foil without an artificial treatment, wherein the surfaces of the electro-deposited copper foil have a surface roughness of 0.2 µm to 2.5 µm.

2. The copper foil of claim 1, wherein the electro-deposited copper foil does not contain a chromium element as a rust prevention surface treating element.

3. A method of manufacturing the copper foil for the secondary battery of claim 1, comprising:
forming the styrene butadiene rubber (SBR) layers on the two surfaces of the electro-deposited copper foil by performing surface treatment on the surfaces of the electro-deposited copper foil with an SBR aqueous solution.

4. The method of claim 3, wherein the electro-deposited copper foil is manufactured via electro-deposition on a drum in an electrolyzer and the electro-deposited foil is wound around a bobbin through an SBR surface treatment section while the electro-deposited copper foil is taken out from the electrolyzer.

5. The method of claim 4, wherein the SBR surface treatment section is provided with an SBR aqueous solution treatment tank and a hot air drying furnace in an in-line manner.

6. The method of claim 3, wherein the SBR layers are formed by immersing the electro-deposited copper foil in the SBR aqueous solution, in which SBR is dispersed in water at a concentration of 1 g/l to 10 g/l, and drying the SBR aqueous solution.

7. A secondary battery, comprising the copper foil of claim 1 as a current collector of a negative electrode.

8. The secondary battery of claim 7, wherein a thickness of the electro-deposited copper foil in the current collector is in a range of 3 µm to 30 µm and a thickness of each of the styrene butadiene rubber (SBR) layers is in a range of 0.5 µm to 5 µm,
the negative electrode comprises a negative electrode active material layer present on the current collector, wherein the negative electrode active material layer comprises a negative electrode active material, a conductive material, and a binder, and
a content of the binder ranges from 1 to 15 wt % based on a total weight of the negative electrode active material layer.

9. The secondary battery of claim 8, wherein the binder is SBR.

10. The secondary battery of claim 7, comprising an electrode assembly comprising a positive electrode, a negative electrode, and a separation film, wherein the negative electrode comprises the electro-deposited copper foil, the SBR layers, and the negative electrode active material layer.

11. The method of claim 3, wherein the SBR layer is immediately coated on the surfaces of the electro-deposited copper foil prepared on a drum surface from an electrolyzer, without an artificial treatment.

12. The copper foil of claim 1, wherein the SBR layers functions as both a rust prevention treatment layer and an adhesive layer.

13. A negative electrode comprising: the copper foil of claim 1 as a current collector, and a negative electrode active material layer.

* * * * *